UNITED STATES PATENT OFFICE.

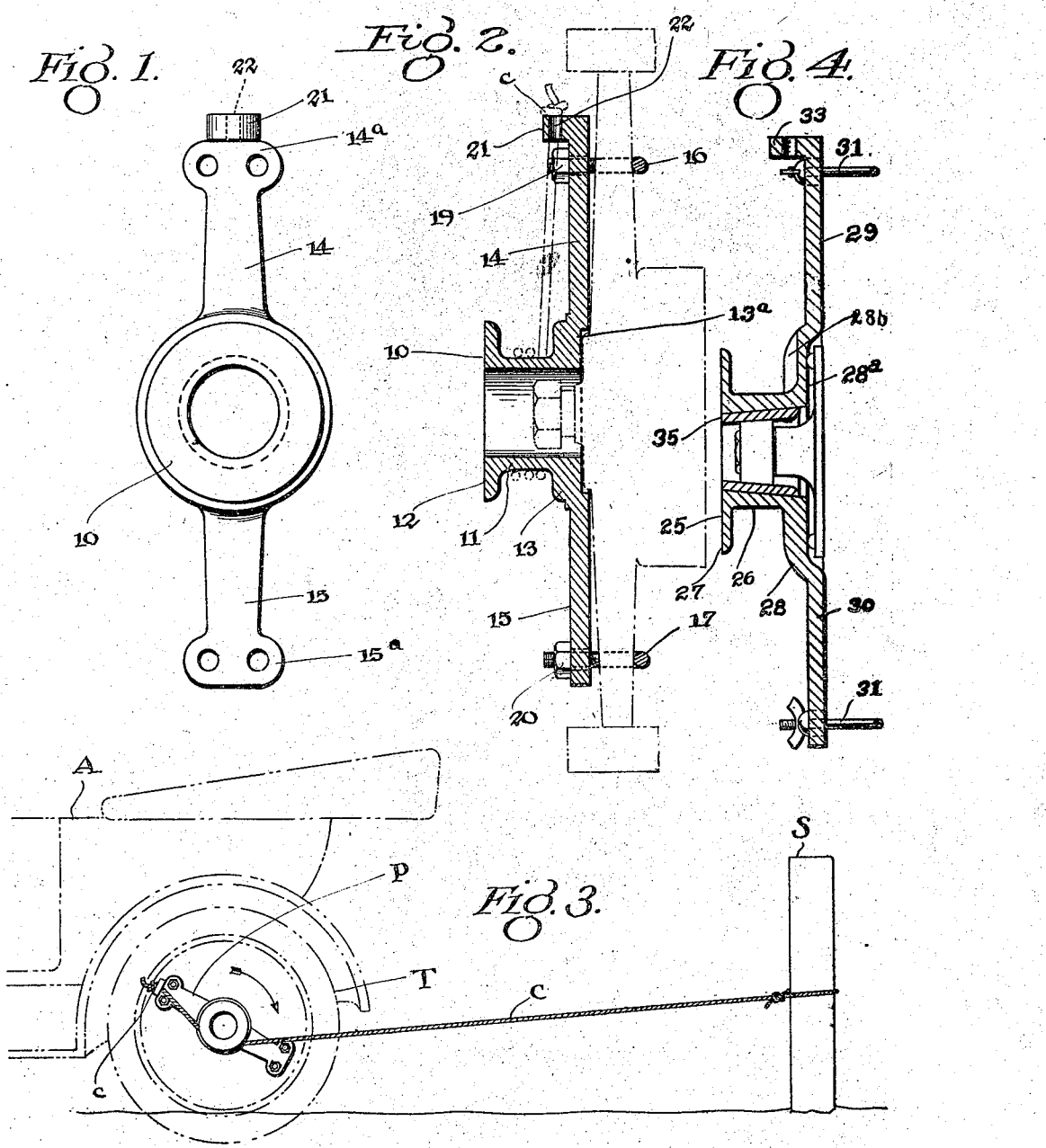

CHARLES DAVID KRELL, OF JACKSONVILLE, FLORIDA.

PULLING DEVICE.

1,426,483.  Specification of Letters Patent.  Patented Aug. 22, 1922.

Application filed April 2, 1921. Serial No. 457,976.

*To all whom it may concern:*

Be it known that I, CHARLES DAVID KRELL, a citizen of the United States, and a resident of Jacksonville, in the county of Duval and State of Florida, have invented certain new and useful Improvements in Pulling Devices, of which the following is a specification.

The present invention relates in general to pulling devices and more particularly to a pulling device especially adapted for use in extracting automobiles or the like from mud holes, ruts or the like.

The object of the invention is to provide a device of this character which is of extremely simple and durable construction, adapted to be carried by the automobile and to utilize the power of the automobile to effect the pulling thereof and which is reliable and safe in operation and easy and inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification, in which—

Figure 1 is a side elevational view of the invention detached,

Figure 2 is a view in transverse vertical section, in position on the wheel of the automobile, the wheel being indicated in dotted lines, Figure 3 is a side elevational view illustrating the invention in operation, Figure 4 is a view in transverse vertical section of a modified form, Figure 5 is a rear elevational view illustrating the manner in which the device may be carried upon the automobile, Figure 6 is an elevational view of a modified form of the invention, and Figure 7 is a detail, perspective view illustrating an attaching device for the cable end.

Referring to the drawings, wherein for the sake of illustration is shown the preferred embodiment of the invention, it will be seen that the invention designated generally at P is adapted to be organized with the traction wheel T of an automobile or similar vehicle indicated at A. A cable C, and post or other stable object S are associated with the invention in a manner which will hereinafter more fully appear.

Referring now especially to Figures 1 to 3 it will be seen that this embodiment of the invention comprises a winding drum designated generally at 10 which includes a cylindrical hub 11 and cheek plates 12 and 13 respectively. The cheek plate 13 is of heavier construction than that of the cheek plate 12 and a pair of diametrically extending arms 14 and 15 are integrally formed with or otherwise secured to this heavy cheek plate 13. The cheek plate 13 abuts the adjacent face of the traction wheel of the automobile and for this purpose it is recessed as at 13ª to accommodate the adjacent clevis plate of the wheel and permit the arms 14 and 15 to lie closer to the spokes thereof. The cylindrical hub 11 of the drum receives the nut and outer end of the axle as shown in dotted lines in Figure 2.

Securing means cooperate with the arms 14 and 15 for mounting the device on the wheel and consist of U bolts 16 and 17 extending through suitable openings formed in laterally enlarged portions 14ª and 15ª provided at the outer end of the arms and embracing the spokes of the wheel which lie adjacent these arms. Nuts 19 and 20 threadedly engage the U bolts 16 and 17 and abut the arms 14 and 15 respectively to complete the securing action.

One of the arms, preferably arm 14, has integrally formed therewith or otherwise secured thereto an eye 21 having its opening 22 extending radially and axially alined with the arms. The cable C has one end extended through the eye and knotted as at *c* to associate this end of the cable with the device. From the knotted end *c* the cable is led around the winding drum and after several convolutions of the cable are formed on the drum the cable is then led to the post, stump or other stable object S to which the other end of the cable is secured.

In operation, as the traction wheel T rotates the pulling device P rotates therewith, and the winding drum 10 of the pulling device partakes of its rotation and winds the cable C thereon, thus drawing or pulling the automobile toward the post or stable object S and extracting it from the mud hole or rut.

In the form of my invention shown in Figure 4, the winding drum is designated generally at 25 and includes a hub 26 of frusto-conical form and cheek plates 27 and 28. The cheek plate 28 carries the diametrically extending arms 29 and 30 and it is recessed as at 28ᵃ to receive the clevis plate of the wheel and is slotted radially at 28ᵇ to accommodate the cable. Securing means identical with the securing means of the first embodiment is provided and includes similar U-bolts 31· and 32. An eye 33 for the cable end is also provided and is similar in all respects to the eye 21 of the first form of the invention.

This embodiment is, however, adapted for use with various styles and sizes of hub caps or axle ends and for this purpose a tapered bushing 35 is inserted in the frusto-conical hub of the winding drum. The tapered bushing is of such size and contour as to compensate for variation in the style of the hub cap, it being understood that these bushings are manufactured in various sizes and contours and that the particular bushing adapted for the particular case is selected from the assortment. The frusto-conical form of the hub of the winding drum and the corresponding form of the bushing cooperate to secure it in position and prevent its displacement. The inner wall of the bushing directly engages the hub cap, thus centering the pulling device and supplementing the supporting action of the securing means and at the same time adapting the pulling device to the particular wheel.

It is to be understood that one of these pulling devices may be associated with each wheel of the automobile, if desired and various changes in size, shape and arrangement of parts may be made within the scope and spirit of the appended claims.

I claim:—

1. In a pulling device for use with automobiles or the like having a traction wheel, in combination with a cable having one end fixed, a winding drum including a hub and cheek plates, one of said cheek plates being arranged to abut the hub of the traction wheel, diametrically extending arms carried by said abutting cheek plate, securing means cooperating with the arms for securing the device in position on the wheel and comprising U-bolts and nuts threaded on said U-bolts and engaging said arms, and an eye carried by the outer end of one of said arms, and having an opening axially alined with said arms and receiving one end of said cable, said cable being wound intermediate its ends on said winding drum.

2. In a pulling device for use with automobiles or the like having a traction wheel, in combination with a cable having one end fixed, a winding drum including a hub and cheek plates, one of said cheek plates being arranged to abut the hub of the traction wheel, arms connected with said hub, securing means cooperating with the arms for securing the device in position on the wheel, and an eye carried by the outer end of one of said arms and having an opening receiving the free end of the cable, said cable being wound intermediate its ends on said winding drum.

3. In a pulling device for use with automobiles, a winding drum including a hub having a frusto-conical bore and cheek plates, arms carried by said hub, securing means cooperating with said arms, and a frusto-conical bushing received in the hub, all as and for the purposes set forth.

CHARLES DAVID KRELL.